Figure 1:
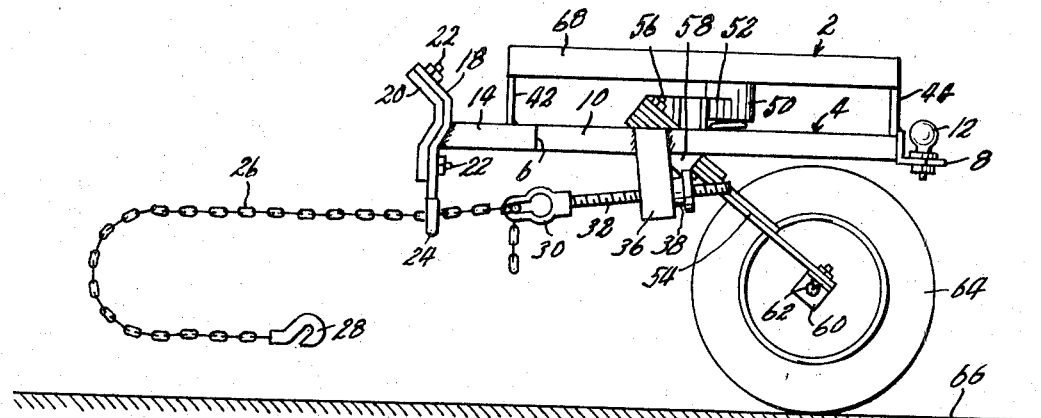

United States Patent [19]
Frank

[11] 3,858,908

[45] Jan. 7, 1975

[54] TRAILER HITCH DEVICE

[76] Inventor: Robert Frank, 6801 W. 127th St., Shawnee Mission, Kans. 66209

[22] Filed: May 29, 1973

[21] Appl. No.: 364,907

[52] U.S. Cl. ............................. 280/476, 280/505
[51] Int. Cl. ........................................ B62d 53/04
[58] Field of Search ............. 280/476, 405 R, 505

[56] References Cited
UNITED STATES PATENTS
| | | | |
|---|---|---|---|
| 2,256,557 | 9/1941 | Gustin | 280/476 R UX |
| 2,596,655 | 5/1952 | Converse | 280/476 R X |
| 2,622,891 | 12/1952 | Knapp | 280/476 R |

FOREIGN PATENTS OR APPLICATIONS
| | | | |
|---|---|---|---|
| 1,082,225 | 6/1954 | France | 280/476 R |

Primary Examiner—Leo Friaglia
Attorney, Agent, or Firm—John A. Hamilton

[57] ABSTRACT

A trailer hitch device consisting of a small carriage supported by a ground-engaging caster wheel and carrying the towing vehicle element of a trailer coupler at its rearward end and attaching devices for joining the forward end of the carriage to the frame of the towing vehicle in such a manner as to permit a small degree of vertical pivoting of the carriage relative to the towing vehicle, but to prevent lateral or horizontal pivoting.

4 Claims, 7 Drawing Figures

TRAILER HITCH DEVICE

This invention relates to new and useful improvements in trailer hitches, and has as its principal object the overcoming of certain common problems and difficulties attendant on the use of these devices.

Perhaps the most common type of trailer coupler is the ball-and-socket type, with the ball element thereof being mounted on the rear bumper of the towing vehicle, and the socket element being mounted on the trailer. However, such bumper-mounted couplers are increasingly coming to be considered unsafe, and to be prohibited by both federal and state safety regulations, because while they are economical and easily installed, automobile bumpers are in themselves often quite flexible and yieldable, and hence do not provide the coupler with a sufficiently rigid support. Safety regulations are hence more and more requiring that the coupler ball element be attached to the actual main frame of the towing vehicle, not its bumper. Frame mounted couplers are available, but are relatively quite expensive, and their installation is a relatively major operation.

Another common problem encountered with trailer hitches occurs when the hitch connection must support the front-end weight of the trailer. This weight is often quite massive, and it imposes a heavy load on the rear wheel suspension system of the towing vehicle, causing the all too common "tail-down" attitude of automobiles towing heavy trailers. Quite commonly, the towing vehicle must be equipped with special overload-weight rear springs and shock absorbers, in order to pull a trailer efficiently.

Accordingly, an object of the present invention is the provision of a trailer hitch device having means for attaching it directly to the frame of the towing vehicle, so that said frame and not the rear bumper carries the draft load, but which nevertheless may be mounted on and demounted from the towing vehicle very easily and conveniently.

Another object is the provision of a trailer hitch device of the character described in which the towing vehicle element of the coupler is provided with its own ground-engaging wheel, whereby to support the front-end weight of the trailer, and thereby to relieve the towing vehicle of this weight.

Other objects are simplicity and economy of construction, and efficiency and dependability of operation.

With these objects in view, as well as other objects which will appear in the course of the specification, reference will be had to the accompanying drawing, where:

FIG. 1 is a side elevational view of a trailer hitch device embodying the present invention.

Figure 2:
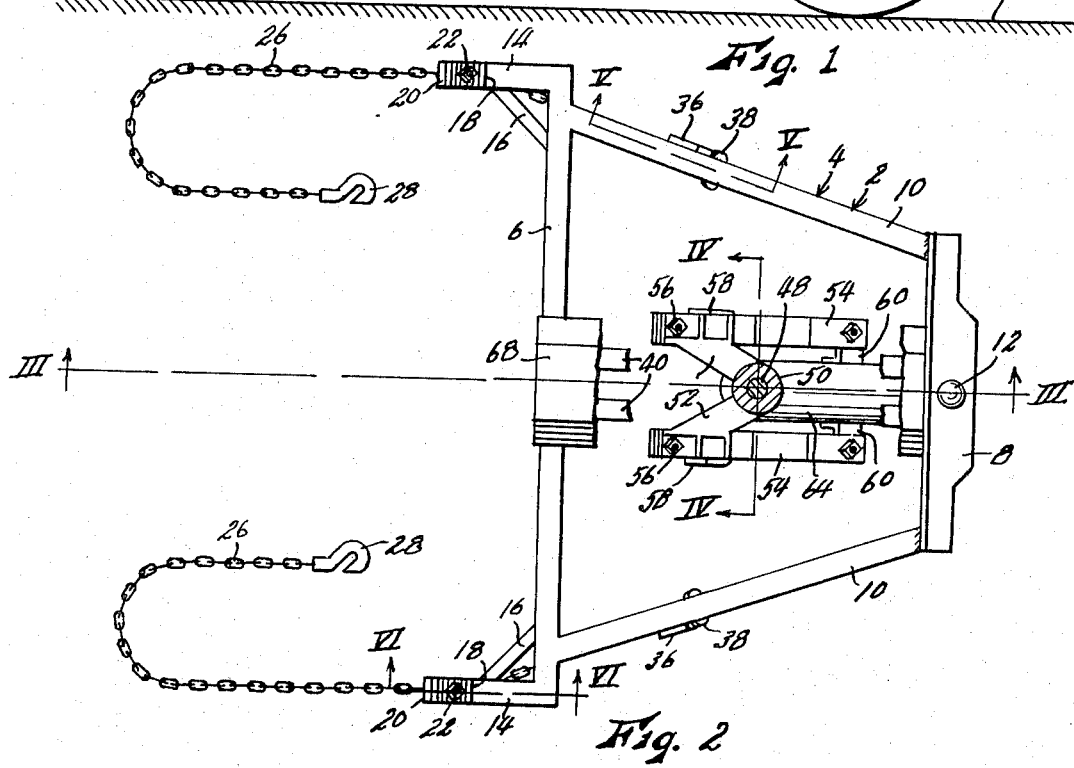
Figure 3:
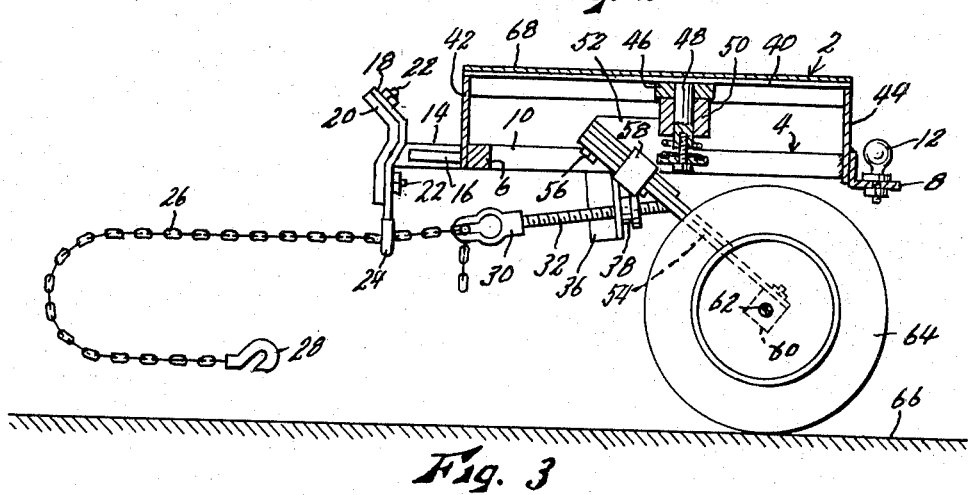
Figure 4:
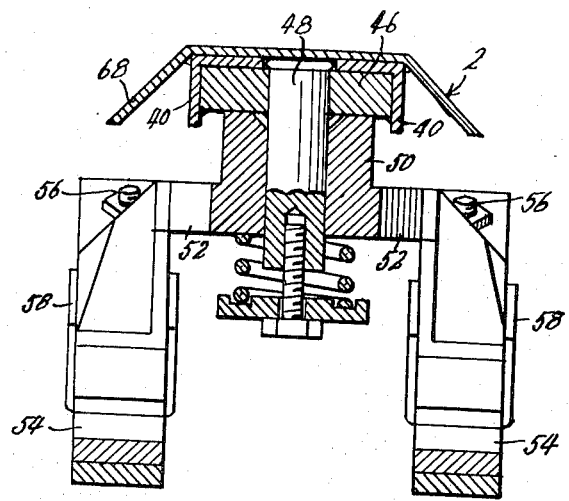
Figure 5:
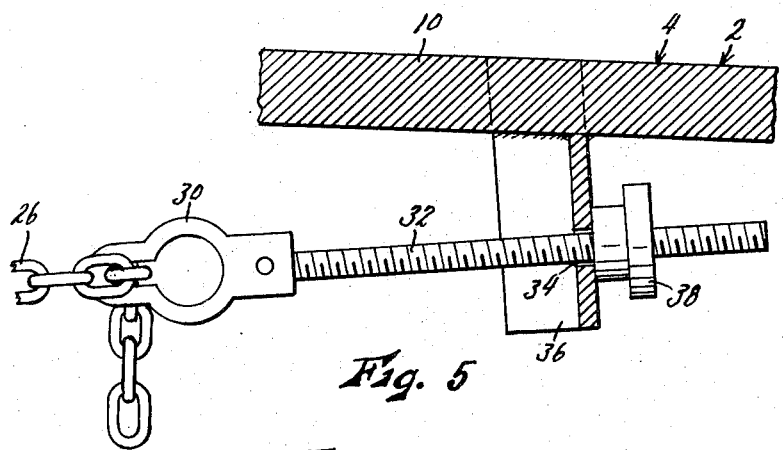
Figure 6:
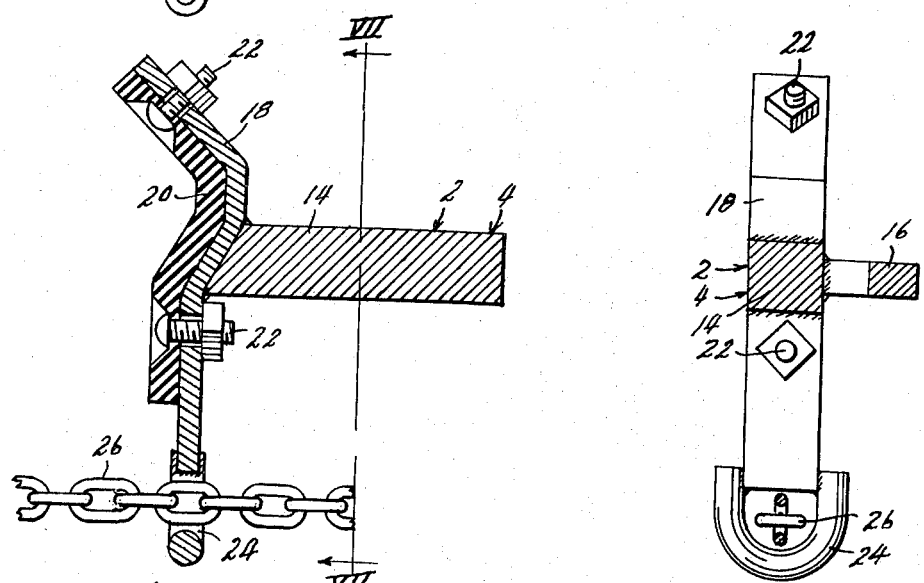
Figure 7:
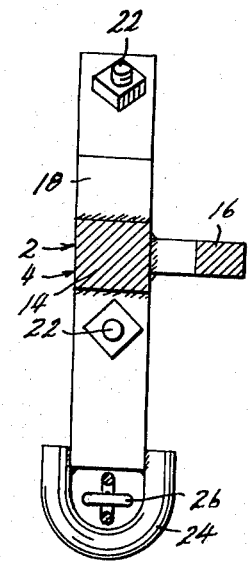

FIG. 2 is a top plan view of the device as shown in FIG. 1, with parts broken away and shown in section, FIG. 3 is a sectional view taken on line III—III of FIG. 2, FIG. 4 is an enlarged sectional view taken on line IV—IV of FIG. 2, FIG. 5 is an enlarged, fragmentary sectional view taken on line V—V of FIG. 2, FIG. 6 is an enlarged, fragmentary sectional view taken on line VI—VI of FIG. 2, and FIG. 7 is a sectional view taken on line VII—VII of FIG. 6.

Like reference numerals apply to similar parts throughout the several views. The device forming the subject matter of the present invention includes a carriage designated generally by the numeral 2 which includes a rigid, normally horizontal frame 4 comprising a transverse front cross bar 6, a transverse rear cross bar 8, and a pair of rearwardly convergent side bars 10, all rigidly joined together. To the midpoint of rear cross bar 8 is affixed the ball element 12 of the actual coupler of the hitch. It will be understood that the socket element of the coupler, not shown, is affixed to the trailer, and engages downwardly over the ball element for universal pivotal movement relative thereto. At each end of front cross bar 6 there is provided a short forwardly extending leg 14, reinforced by a diagonal brace 16. To the forward end of each leg 14 there is affixed a vertically extending strap of heavy metal constituting a bumper "shoe" 18 which extends both above and below its associated leg 14. A portion of the height thereof is forwardly, concave, and is provided with a liner 20 (see FIG. 6) of rubber or other suitable material affixed thereto as by bolts 22. An eye member 24 is affixed to the lower end of each shoe.

The two bumper shoes 18 are adapted to engage the rear surface of the rear bumper of the towing vehicle at widely spaced apart points, and each is adapted to be pulled firmly against the bumper by a linked chain 26 or the like which extends in freely running relation through the associated eye 24. The eye is sufficiently low to be disposed beneath the level of the bumper of the towing vehicle, and the chain extends forwardly from said eye to any desired distance, beneath the bumper, and is provided at its forward end with a hook 28. Said hook may be directly engaged with a portion of the main frame or chassis of the towing vehicle frame, or the chain may be looped about said frame or chassis, and its hook engaged on the standing portion of the chain itself. Each chain also extends rearwardly from its eye 24, and has one link thereof engaged in the keyhole eye of a chain fastener 30 which is affixed to the forward end of an elongated screw 32 disposed beneath the associated side bar 10 of frame 4. Said screw (see FIG. 5) extends freely through a hole 34 formed therefor in an angle iron leg 36 affixed to and depending from the associated side bar 10, and has a nut 38 threaded thereon behind said leg. The chains are first attached to the vehicle frame, the chains are adjusted to the approximately desired effective length by proper selection of the links thereof engaged in fasteners 30, and finally tightened by turning nuts 38, whereby to draw bumper shoes 18 firmly against the vehicle bumper.

A pair of horizontal angle irons 40 extend longitudinally of the carriage above the level of frame 4, being rigidly supported at their forward and rearward ends by posts 42 and 44 affixed at their lower ends to front and rear cross bars 6 and 8 of said frame. Intermediate said front and rear cross bars, angle irons 40 have affixed thereto a block 46 in which is affixed a depending stub axle 48. Mounted rotatably on said axle is a hub member 50 from which a pair of integral arms 52 extend in forwardly divergent relation. A beam 54 formed of leaf springs is attached at its upper end, as by bolt 56 and clip 58, to the forward end of each arm 52. Said beams are inclined downwardly and rearwardly in parallel relation, and the lower ends of said beams are attached, as by brackets 60 to the respectively opposite ends of a wheel axle 62 on which is rotatably mounted a wheel 64 which engages the ground or roadway 66 to support frame 4 normally in a horizontal position above the ground. Angle irons 40 are provided with a cover 68 to protect the caster mounting of wheel 64 from the weather. With the device mounted as above dexcribed, the socket member of the hitch coupler, which as will be understood is mounted directly on the trailer, is engaged downwardly over ball member 12, and locked against accidental disengagement therefrom, by well known means.

In operation, with the device attached to the towing vehicle as described, and the coupler socket engaged over ball 12, it will be seen that the entire towing or draft force is exerted by the frame of the towing vehicle, acting through chains 26, not by the bumper itself of the vehicle. The device thus complies with safety regulations prohibiting hitches in which the towing load is supported by the bumper of the towing vehicle, which may be dangerously flexible or yieldable. The bumper shoes 18 of the device position the device firmly with respect to the towing vehicle, but in no event carry the towing load. The spaced engagement of the shoes with the bumper also prevents frame 4 from pivoting horizontally or laterally with respect to the towing vehicle, so that at least considered in a horizontal plane, frame 4 and ball 12 are rigidly associated with the towing vehicle. This relationship avoids the uncertainty of steering, particularly when backing, which would result if frame 4 constituted a link connecting the towing vehicle to the trailer, and horizontally pivoted at both ends. At the same time, frame 4 must be vertically pivotable relative to the bumper, in some slight degree, to permit necessary vertical movement thereof as the towing vehicle and trailer traverse ridges or depressions in the ground surface. The concavity of shoes 18, where they engage the bumper, permits the necessary vertical pivotal movement of the frame, which at most amounts only to a few degrees, and chains 26 do not interfere appreciably with this movement. Some slight actual slippage may occur between shoes 18 and the bumper at this time, but not enough to effect any disengagement therebetween, while shoe liners 20 prevent any marring of the bumper.

At the same time, it will be seen that wheel 64 supports the front-end weight of the trailer being towed directly from the ground, rather than transmitting it to the towing vehicle. The towing vehicle thus being relieved of the trailer weight, need not be supplied with the overload-type, heavy duty rear springs and shocks heretofore often required, particularly when the towing vehicle is a passenger automobile having normally soft spring suspension systems to provide maximum comfort. In fact, since ball 12 is disposed rearwardly of wheel 64, the trailer weight on ball 12 tends in some degree to tilt frame 4 in the manner of a lever, fulcrummed about the point of engagement of wheel 64 with the ground, so that the trailer weight is converted into an upward force on shoes 18 and the bumper they engage. However, the lever arms are so proportioned that any such upward force on the towing vehicle is only slight, not enough to interfere appreciably with its riding characteristics or ground traction.

Wheel 64 must be castered as shown to permit it to trail properly in a turn, since carriage frame 4 is positively restrained against horizontal pivoting relative to the bumper. It must caster through a full 360°, to permit reversal thereof when the vehicle and trailer are backed. The load supporting action of wheel 64 is of course cushioned by the vertical yieldability of its supporting spring beams 24. Yielding of these arms of course results in vertical pivotal movement of carriage frame 4, and this is an additional requirement necessitating vertical pivotal movement of the carriage frame relative to the bumper. Action of spring beams 54 also may be dampened with common shock absorbers, not shown because the provision thereof is a standard, well known expedient.

While I have shown and described a specific embodiment of my invention, it will be readily apparent that many minor changes of structure and operation could be made without departing from the spirit of the invention.

What I claim as new and desire to protect by Letters Patent is:

1. A trailer hitch device comprising:
   a. a carriage adapted to be disposed intermediate a towing vehicle and a trailer,
   b. a ground-engaging wheel carried rotatably by said carriage,
   c. attaching means operable to connect the forward end of said carriage to said towing vehicle, and comprising a bumper shoe mounted at the forward end of said carriage, said shoe being forwardly concave whereby to engage the rearwardly convex surface of the rear bumper of a towing vehicle, a flexible tensile member attached at its rearward end to said carriage, extending forwardly of said bumper shoe so as to extend forwardly beneath said bumper, and having means at its extended end for securing it to the frame of said towing vehicle, the concavity of said shoe permitting a degree of vertical pivotal movement of said carriage relative to said bumper, and means operable to tighten said tensile member, whereby said shoe is pressed firmly against said bumper, and
   d. the towing vehicle element of a hitch coupler mounted on said carriage at the rearward end thereof, whereby to be engageable by the trailer element of said coupler mounted on said trailer.

2. A device as recited in claim 1 wherein said wheel is mounted in said carriage for yieldable vertical movement relative to said carriage by means including vertically yieldable springs.

3. A device as recited in claim 1 wherein said attaching means includes at least two of said bumper shoes spaced apart transversely of said carriage to engage said bumper at widely spaced apart points, whereby transverse horizontal pivoting of said carriage relative to said bumper is prevented and wherein said wheel is mounted in said carriage by castering means permitting rotation of said wheel about a vertical axis horizontally apart from its axis of rotation.

4. A device as recited in claim 1 wherein said means for tightening said tensile member comprises:
   a. a support fixed on said carriage,
   b. a screw affixed at its forward end to the rearward end of said tensile member, and extending loosely through a hole formed in said support, and
   c. a nut threaded on said screw rearwardly of said support.

* * * * *